Dec. 4, 1928.

C. E. MAYNARD 1,694,225

METHOD OF INSERTING VALVES IN ANNULAR TUBES

Filed Aug. 30, 1926

INVENTOR.
Charles Edgar Maynard
BY Edward C. Taylor
ATTORNEY.

Patented Dec. 4, 1928.

1,694,225

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF INSERTING VALVES IN ANNULAR TUBES.

Application filed August 30, 1926. Serial No. 132,362.

This invention relates to the vulcanization of annular tubes, particularly those used as inner tubes for automobile tire casings.

One object of this invention is to form annular tubes without the necessity of inserting the valve clamping-nut through the hole in the valve pad. Another object of the invention is to avoid the discoloration during vulcanization of those parts of the valve which are exposed in the finished tube. Another object of the invention is to make the valve replaceable after the tube is finished so that it may be removed in the service station and a valve of a different type substituted for it. Another object of the invention is to improve the manufacture of the tube from the standpoint of rapidity and cheapness of manufacture.

The invention will now be described with reference to the accompanying drawings, in which Fig. 1 is a view of a tube in the first stage of its manufacture;

Figure 1:
Figure 2:
Fig. 2 is a similar view showing part of the valve placed within the tube.
Figure 3:
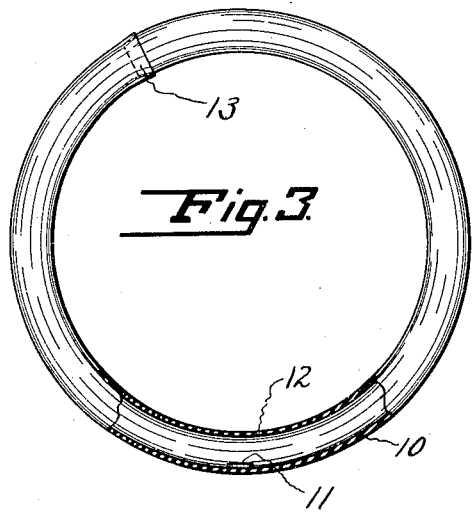
Fig. 3 is a similar view showing the tube spliced into annular form.
Figure 4:
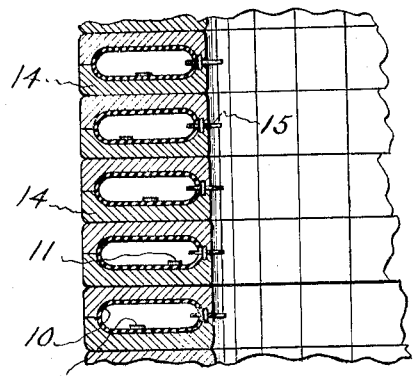
Fig. 4 is a sectional detail showing the vulcanization of the tube.
Figures 5, 6, 7:
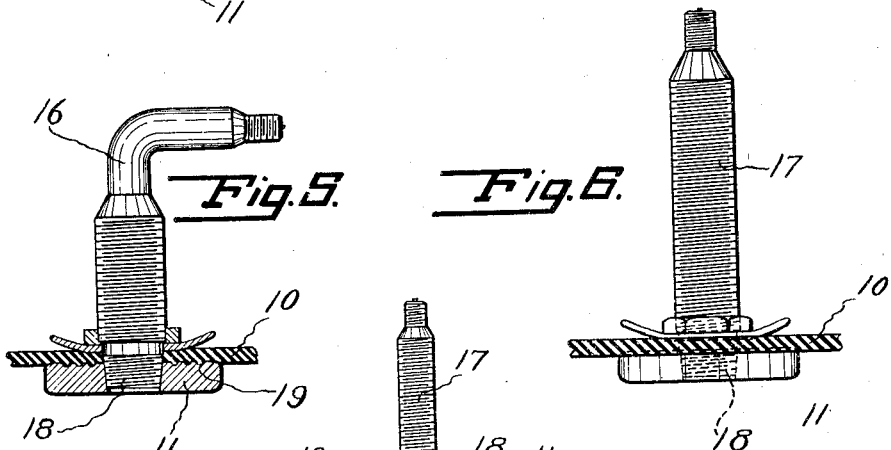
Fig. 5 is a detail showing the manner of applying a valve stem to the tube.
Fig. 6 is a similar view illustrating a different type of valve stem.
Fig. 7 is a detail showing the manner in which the valve stem is assembled in place.

The rubber tube 10 is formed in any suitable manner, as on a straight or a curved mandrel or by a tubing or extrusion process. Initially, the ends of the tube are opened as shown. Into this tube is placed the head or nut 11 of the valve which, contrary to general practice, is according to my invention made separate from the body of the valve. At about the same time, that is, while the ends of the tube are still open, the valve hole 12 is punched in the tube. The ends of the tube are then brought together and spliced as indicated by 13 in Fig. 3, the valve head 11 remaining freely within the tube at this time.

The tube is now ready for vulcanization. For this purpose a temporary valve stem 15 is inserted and the tube placed in molds 14 of any suitable type. Vulcanization is completed with the valve head 11 resting freely in the tube. The valve head is preferably made quite light, this lightness being sufficient so that it will not sink into the rubber of the tube any material amount when the rubber becomes softened during the vulcanization process.

After vulcanization has been completed the temporary valve stem 15 is removed. The valve head 11 is now shaken to a point adjacent the valve hole 12 and the end of the valve stem 17 inserted through the hole. The end of the valve stem is preferably formed with a pipe thread 18, and the valve head 11 is formed with a corresponding pipe thread in its central hole. A glycerin-litharge or other air-proofing sealing medium may be applied to the threads if desired. The valve head is easily gripped manually through the rubber and held while the valve stem is being screwed into it. Instead of using a pipe thread a taper joint can be employed, but the pipe thread is generally preferable. If the pipe thread is used it is, of course, necessary to have the larger end of the tap hole toward the hole 11. To facilitate the recognition of the different sides of the head while it is concealed within the tube, the head 11 is preferably provided with corrugations on one side, these serving to make the feel of the two sides different and also to give a tighter grip on the rubber tube 10.

Since the valve stem 17 is not in contact with the tube during vulcanization it cannot become discolored, any discoloration of the head 11 being immaterial as this is mounted within the tube out of sight when the tube is finished. If it is desired to replace the valve, the valve stem 17 can easily be unscrewed from the head 11.

Having thus described my invention, I claim:

1. A method of making rubber tubes which comprises forming an open-ended tube, placing loosely inside the tube a portion of a valve adapted to form one member of a clamping means for sealing the valve in the tire, said portion being of insufficient weight to penetrate the rubber stock substantially during vulcanization, splicing the ends of the tube, vulcanizing the tube, inserting a valve stem into the tube, and affixing the first-mentioned valve portion to the valve stem.

2. A method of making rubber tubes which comprises forming an open-ended tube, cutting a valve hole therein, placing loosely inside the tube a valve head of insufficient weight to penetrate the rubber stock substantially during vulcanization, splicing the ends of the tube, inserting a temporary valve stem into the valve hole, vulcanizing the tube under internal fluid pressure applied through the temporary valve stem while the valve head is free inside of the tube, removing the temporary valve stem, inserting a permanent valve stem into the valve hole, and securing the valve head to said valve stem.

3. A method of vulcanizing inner tubes in which the valve stem is applied in two parts, one of which rests freely upon the inside of the tube rubber during vulcanization and the other is attached thereto through the valve hole after vulcanization.

CHARLES EDGAR MAYNARD.